United States Patent [19]
Parkinson

[11] Patent Number: 5,715,643
[45] Date of Patent: Feb. 10, 1998

[54] AUTOMOTIVE SPACE FRAME JOINING SYSTEM

[75] Inventor: Raymond D. Parkinson, Livermore, Calif.

[73] Assignee: Kaiser Aluminum & Chemical Corporation, Pleasanton, Calif.

[21] Appl. No.: 663,591

[22] Filed: Jun. 14, 1996

Related U.S. Application Data

[63] Continuation of Ser. No. 381,393, Jan. 31, 1995, abandoned.
[51] Int. Cl.⁶ .................................................. E04C 2/38
[52] U.S. Cl. .................... 52/656.9; 403/231; 403/256; 296/203; 296/205; 296/29; 52/730.4; 52/731.2; 446/125
[58] Field of Search .................... 52/648.1, 655.1, 52/656.8, 656.9, 664, 665, 667, 671, 674, 736.2, 737.2, 730.4, 737.6, 731.2; 403/231, 256; 296/203, 205, 29; 280/781, 785; 446/125, 127

[56] References Cited

U.S. PATENT DOCUMENTS

| | | |
|---|---|---|
| 4,069,638 | 1/1978 | Hasselquist et al. ............. 403/231 X |
| 4,147,007 | 4/1979 | Eppich ............................ 446/125 X |
| 4,618,163 | 10/1986 | Hasler et al. ...................... 280/785 |
| 4,660,345 | 4/1987 | Browning ............................ 52/648 |
| 4,988,230 | 1/1991 | Banthia et al. ..................... 403/170 |
| 5,059,056 | 10/1991 | Banthia et al. ..................... 403/170 |
| 5,209,541 | 5/1993 | Janotik ........................... 280/785 X |

FOREIGN PATENT DOCUMENTS

| | | | |
|---|---|---|---|
| 990651 | 3/1944 | France ............................ 446/125 |
| 2252056 | 7/1992 | United Kingdom ................. 446/125 |

*Primary Examiner*—Creighton Smith
*Attorney, Agent, or Firm*—P. L. McGarrigle; G. D. Haynes

[57] ABSTRACT

An automotive space frame joining system. The joining system includes a pair of extruded aluminum alloy lineal hollow rectangular members, the first lineal member having a top end, a bottom end and two opposing sides, each opposing side including a plurality of substantially similar longitudinal grooves running from the bottom end towards the to end of the first lineal member, the second lineal member having a top and a bottom longitudinal surface, the bottom end of the first lineal member abutting the top lineal surface of the second lineal member; and two pair of universal joining members, each joining member comprising a span and an interlocking member attached to the span, each pair fastened to opposing sides of the second lineal member and positioned such that each interlocking members of each joining member provides interlocking engagement within the opposing grooves of the first lineal member, thereby providing a space frame exhibiting great strength.

23 Claims, 4 Drawing Sheets

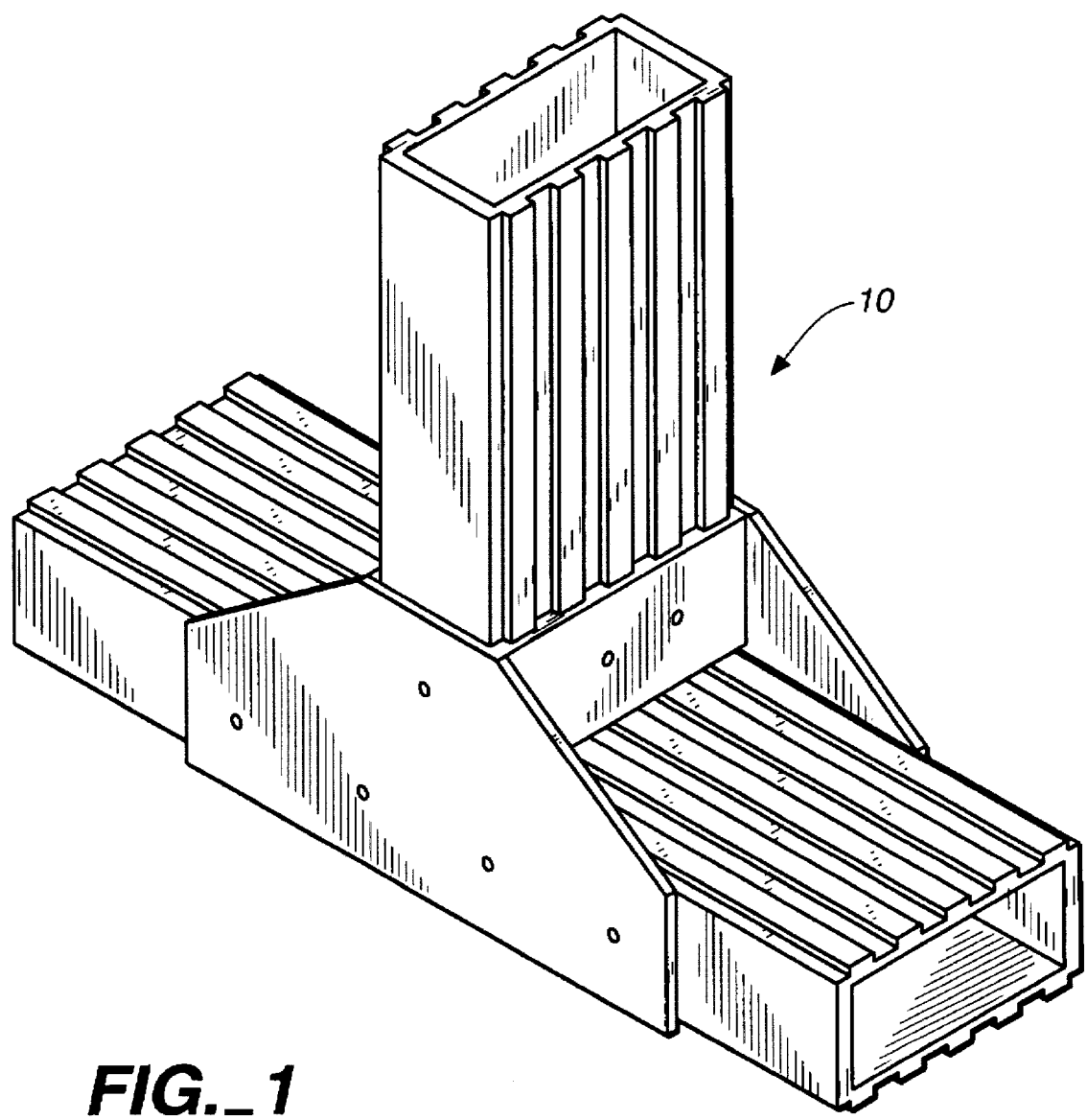
FIG._1

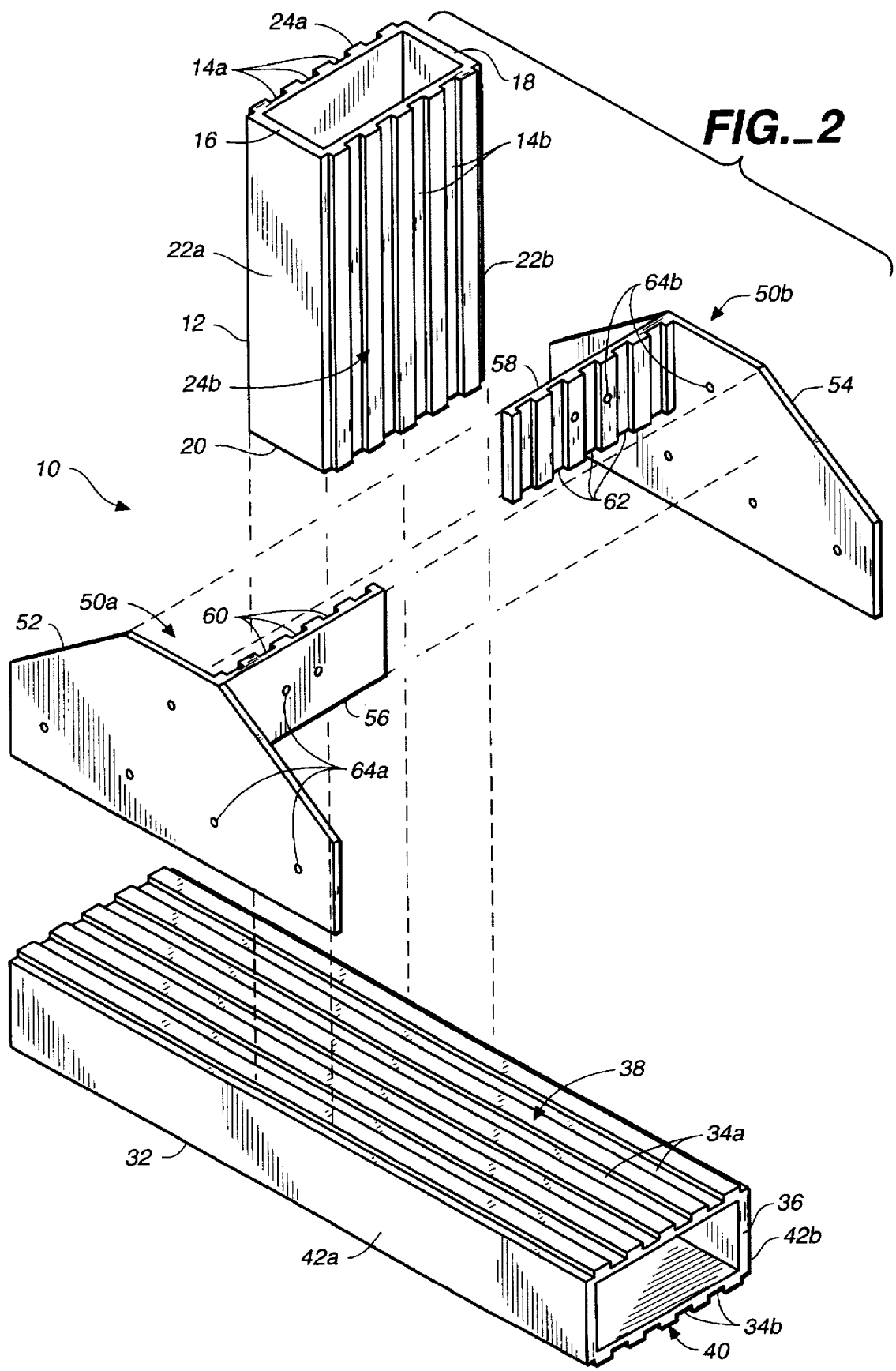
FIG._2

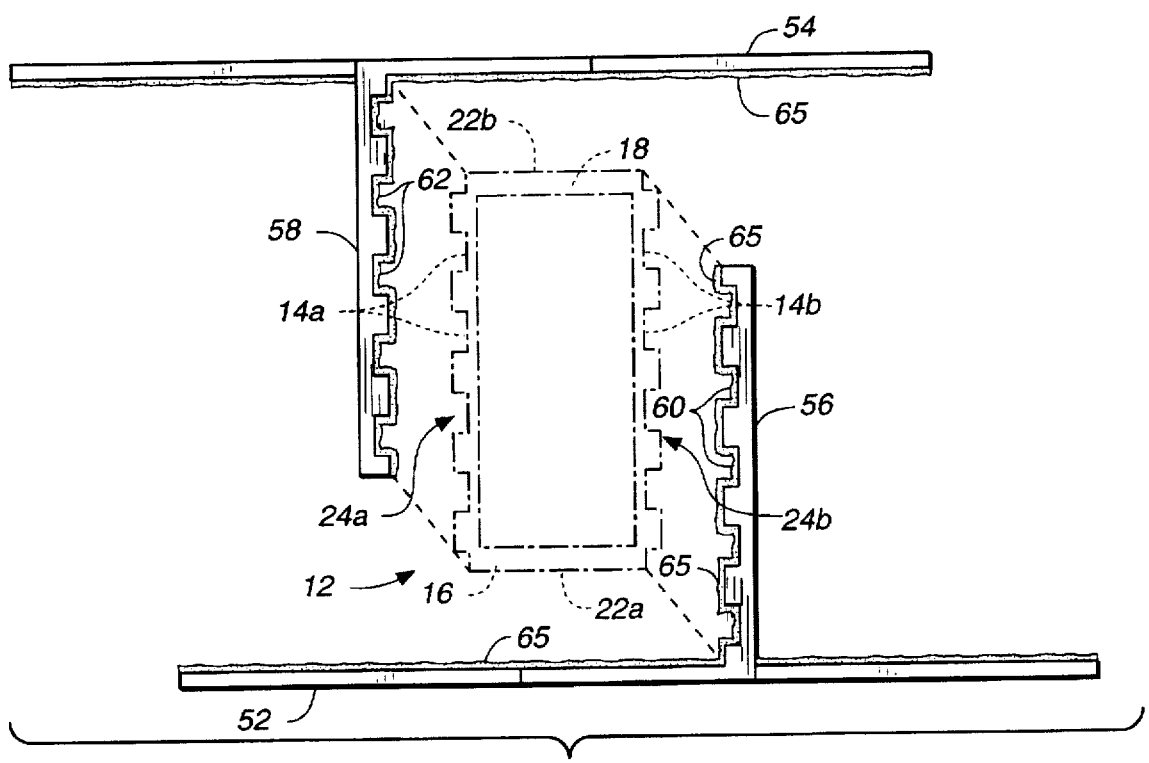
FIG._3
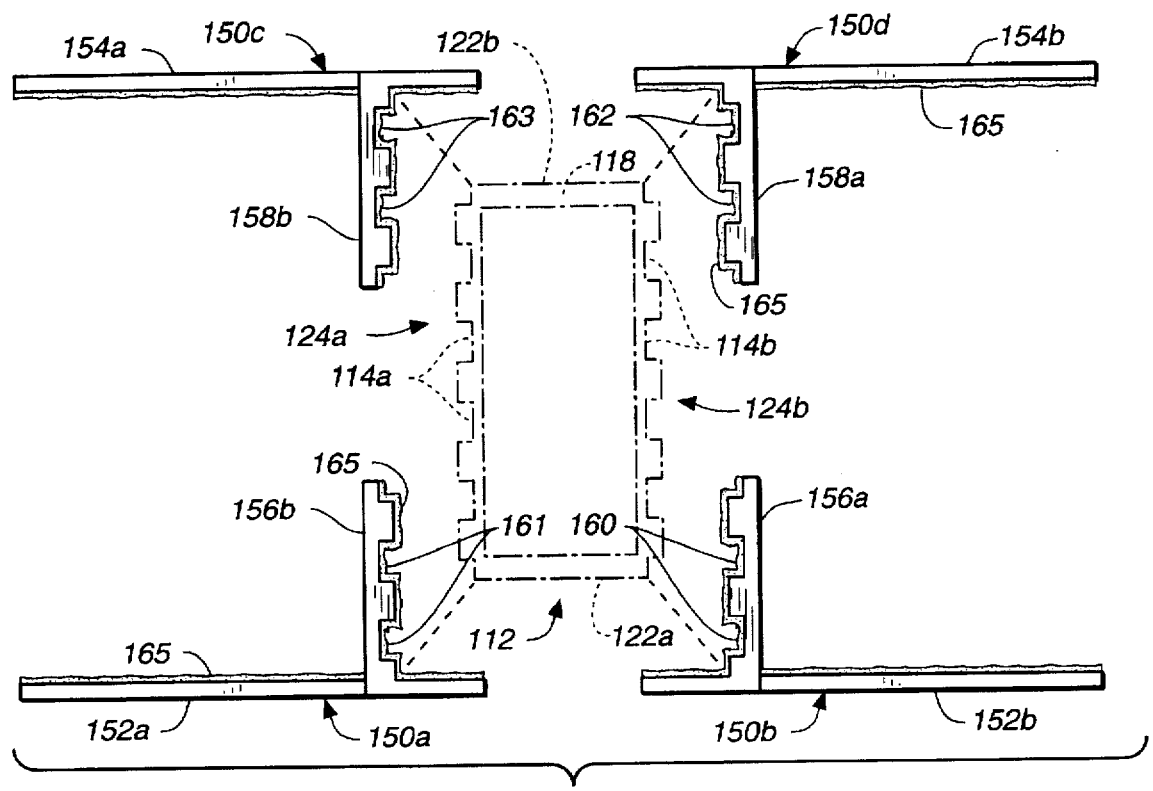
FIG._5

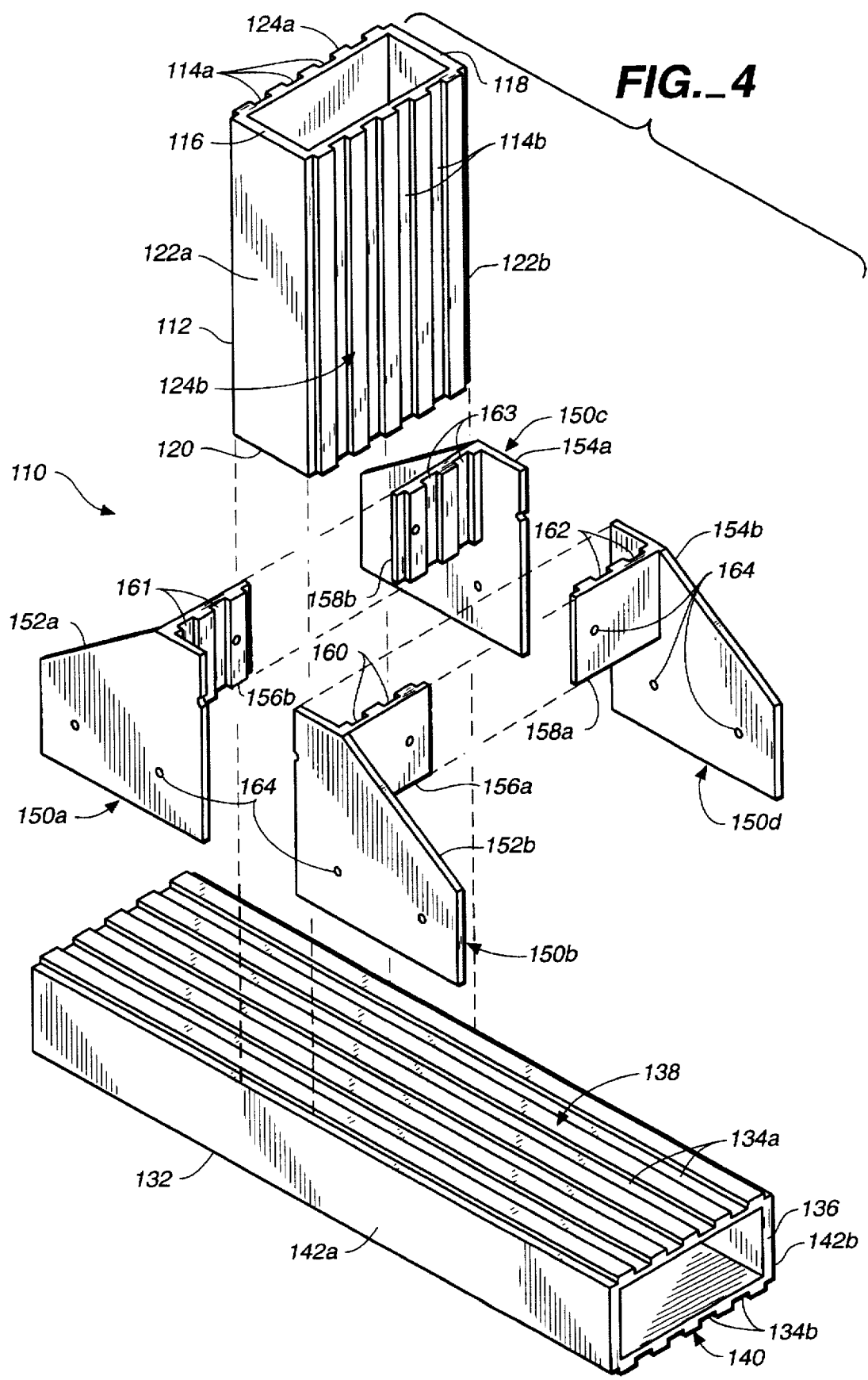

AUTOMOTIVE SPACE FRAME JOINING SYSTEM

This application is a continuation of U.S. application Ser. No. 08/381,393, filed Jan. 31, 1995, now abandoned.

BACKGROUND OF THE INVENTION

1. Field of the Invention

This invention relates to joining devices suitable for joining lineal or formed members to provide a structure such as a space frame or an assembly. More particularly, this invention relates to a joining system for joining automobile chassis members to form automobile space frame structures.

2. Description of the Related Art

In contemporary automobile constructions, space frames are used to impart strength and rigidity to the automobile chassis. These space frames generally consist of extruded lineal, straight or curved light metal members fastened together at junction points either through welding or through using joining devices. The connection produced between straight or curved lineal members by direct means, for example by welding or by bolting, may lack the desired physical properties and the process is also labor intensive. Thus, workers in the field have found that it is more expedient to employ joining devices which can be readily used for the connection of chassis members at the desired junctions without major efforts. Workers in the field have employed several systems for joining lineal members.

For example, in U.S. Pat. No. 4,660,345 to Browning, elongated metal structural frame members, such as steel pipes, are joined into motor vehicle space frames by using thin walled, cast metal connectors. The elongated frame members are first seated in the castings and are then made into a structure by either welding or gluing the frame members to the casting. The manufacture of the space frame according to Browning has the advantage that it can be assembled at a location remote from the automotive plant, standard castings can be used for the connectors and the assembly can be accomplished by relatively unskilled labor. The manufacture of space frames using the thin walled castings as connectors requires different castings depending on the angles the space frame members are to be joined. This demands a substantial inventory of thin walled castings having different contours and it also requires that a strict construction pattern be followed for each space frame in order to obtain the desired structure.

U.S. Pat. No. 4,618,163 to Hassler et al. describes automotive chassis made from extruded light metal rods held together by joining members also made of light metal, the rods, which are preferably hollow, are connected by means of joining devices which are provided with complimentary recesses or protrusions to allow fitting of the rods by axial or radial movement. The joining of the rods into a space frame is accomplished by nesting of the pans, for example, by nesting of a protruding part of a rod in a corresponding recess in the connector device. The strength of the joint between the rod and connector can be increased by the application of suitable adhesives. While the tubular members used for the space frames can be readily standardized, a large number of connectors of different shapes and types is needed. This not only results in a low volume assembly, but also requires a significant inventory of different connector devices.

U.S. Pat. No. 4,988,230 and U.S. Pat. No. 5,059,056, both to Banthia et al., disclose the use of an extruded aluminum node for joining lineal members into an automotive space frame. The node comprises a longitudinally extending hollow core and hollow flanges adapted to connect lineal space frame members. The lineal members may be inserted in the hollow core or may be seated on the flanges. The insertion and/or seating connection between the lineal members and the node is claimed to generate a suitably strong joint without the need to attach the node to the lineal members by welding or gluing. While the nodes described in these references improve the ease of assembly of space frame members, the design requires the manufacture of a large number of extruded nodes of different designs and thus the maintenance of a significant inventory.

In order to comply with fuel consumption standards the automotive industry requires light weight, but strong space frames for the construction of automotive chassis. It is a further requirement that the space frames be readily assemblable from as few pans as possible so that the inventory of differing space frame parts can be kept at a minimum and time for assembly can be reduced. Also, the space frame pans should be easy to assemble to allow higher volume assembly work and maximum manufacturing efficiencies.

Accordingly, a need remains for an automotive space frame connector system that provides all of the aforementioned advantages, can be universally employed for frame members of different widths and size and produces joints between the space members that exhibit high strength. Additional needs include a system that provides the ready joinability of the connector device to the frame members thus allowing efficient manufacture and minimizing the inventory of required parts. Accordingly, it is a principle object of the present invention to provide such a system.

SUMMARY OF THE INVENTION

The general purpose of the present invention is an automotive space frame joining system for joining two lineal members together at right angles or any other plurality of angles as so may be desired.

This invention concerns an automotive space frame joining system. It comprises a pair of lineal members, the first lineal member having a top end, a bottom end and two opposing sides, each opposing side including a plurality of substantially similar longitudinal grooves running from the bottom end towards the top end of the first lineal member, the second lineal member having a top and a bottom longitudinal surface, the bottom end of the first lineal member abutting the top lineal surface of the second lineal member; and universal joining means, attached to the second lineal member, for joining the bottom end of the first lineal member to the top surface of the second lineal member wherein the joining means includes a plurality of parallel grooves providing for interlocking engagement within the opposing grooves of the first lineal member, thereby providing space frame joints exhibiting high strength.

In an alternative embodiment, the universal joining means comprises a pair of universal joining members each comprising a span and an interlocking means attached to the span, each span fastened to opposing sides of the second lineal member and positioned such that each interlocking means provides interlocking engagement within the opposing grooves of the first lineal member.

And for larger space frames, the present invention comprises universal joining means which include two pair of universal joining members, each joining member comprising a span and an interlocking means attached to the span, each pair fastened to opposing sides of the second lineal member and positioned such that each interlocking means of each joining member provides interlocking engagement within the opposing grooves of the first lineal member.

The foregoing and other objects, features, and advantages of the invention will become more readily apparent from the following detailed description of preferred embodiment which proceeds with reference to the drawings.

BRIEF DESCRIPTION OF THE DRAWINGS

FIG. 1 is a pictorial view of a space frame joining system in accordance with the present invention.

FIG. 2 is an exploded view of the space frame joining system of FIG. 1.

FIG. 3 is a partial top plan view of the space frame joining system of FIG. 2.

FIG. 4 is an exploded view of a preferred embodiment of a space frame joining system in accordance with the present invention.

FIG. 5 is a partial top plan view of the space frame joining system of FIG. 4.

DETAILED DESCRIPTION OF THE PREFERRED EMBODIMENT

Referring to the drawings, FIGS. 1–3 illustrate a typical space frame joining system 10 of the present invention. System 10 comprises a pair of lineal members 12 and 32 which are held together by a pair of universal joining members 50a and 50b. The lineal members 12 and 32 can be virtually any multi-sided shape but I prefer a four-sided rectangular shape. The first lineal member 12 has two interlocking sides where each side has a plurality of substantially similar longitudinal parallel grooves 14a and 14b, running the length of first lineal member 12. The second lineal member has a top surface 38 and a bottom surface 40. The first lineal member 12 is positioned substantially perpendicular to top surface 38 of the second lineal member 32 so that bottom end 20 sits flush against top surface 38. Optionally, the first lineal member 12 can be positioned at various angles, such as 45°, relative to the top surface of the second lineal member 32. To standardize manufacture of the present invention, I prefer to use second lineal members which are identical in shape and size to the first lineal members described above. This allows a manufacturer to minimize inventory and to reduce costs of production. Specifically, I prefer that the second lineal member 32 includes a plurality of substantially similar longitudinal parallel grooves 34a running the length of top surface 38 and similar longitudinal grooves 34b running the length of bottom surface 40.

The lineal members 12 and 32 can be any aluminum alloy such as the 5xxxx, 6xxx, or 7xxx series alloys or other light metals such as magnesium. I prefer to use aluminum alloys containing silicon and magnesium in proportions that make them heat treatable, particularly including aluminum alloys 6061, 6063, variations thereof and similar alloys.

The lineal members of this invention generally are made of an extruded aluminum alloy. Extruded lineal members exhibit metallurgical and physical properties, such as alloy consistency, dimensional stability, ductility and strength, which are enhanced and more consistent than those typically obtained by other processes such as casting. I prefer to use extrude alloys over cast alloys primarily because of the lower cost. This invention does, however, comprehend lineal members either extruded or cast of any material.

For the purposes of this invention, the term "extruded" refers to shaping by forcing through dies under pressure, to form longitudinally extending elements which may be cut into sections. In extruding products, an ingot or billet is forced into flow under pressure through a die opening to form an elongated shape. The lineal members of the present invention may be separated into segments such as by cutting or shearing.

I prefer that the rectangular lineal members 12 and 32 be substantially hollow. By substantially hollow, I mean that the majority of the cross section is hollow. This hollow configuration is primarily desirable to reduce the weight of the overall structure. There are of course practical limits on the lightweighting that can be accomplished. I have found, however, that the preferred thickness of wall 18 ranges from about 2.0 to 8.0 mm. A wall thickness of less than 2.0 mm renders it difficult to introduce grooves into the lineal members.

As shown in FIGS. 1–3, the first lineal member 12 comprises longitudinally extending, substantially similar grooves 14a and 14b along interlocking sides 24a and 24b. In general, each interlocking side has from 2 to 9 substantially parallel grooves which extend the length of lineal member 12. I prefer that the grooves range from about 3.0 to 20 mm in width and from about 1.5 to 3.0 mm in depth. For wider lineal members, I can either employ an additional number of substantially equally positioned grooves or I can make the existing grooves wider to obtain structural integrity For example, a lineal member having a 50 mm width, I would employ three equally spaced parallel grooves, having groove widths of about 6 mm.

As stated above, I prefer that the first and second lineal members be standardized to facilitate efficient manufacture. Thus, in a preferred embodiment, second lineal member 32 comprises grooves 34a and 34b which are substantially identical in number, width, and depth as grooves 14a and 14b. Preferably, grooves 14a, 14b, 34a, and 34b are included in the extrusion die profile which produces further efficiencies in the manufacturing process.

In general, the pair of lineal members 12 and 32 are joined together by way of a pair of universal joining members 50a and 50b. Joining member 50a comprises span 52 and interlocking member 56 which is positioned perpendicularly to span 52. Interlocking member 56 comprises a plurality of substantially similar grooves 60 which extend generally across the width of interlocking member 56. Joining member 50a is mounted on lineal member 32 such that span 52 is flush against side 42a and grooves 60 interlock with grooves 14b of lineal member 12. Similarly, joining member 50b comprises span 54 and interlocking member 58 which is mounted perpendicularly to span 50b. Interlocking member 58 comprises a plurality of substantially similar grooves 62 which extend generally across the width of interlocking member 58. Joining member 54 is mounted to lineal member 32 such that span 54 is flush against side 42b and grooves 62 interlock with grooves 14a of lineal member 12.

The universal joining members of this invention generally are made of a light metal, preferably an extruded aluminum alloy. As with the extruded lineal members, the extruded joining members have superior metallurgical an physical properties such as alloy consistency, dimensional stability, ductility and strength compared to those obtained by other processes such as casting. Typically, I prefer to use the same aluminum alloy as I use for the lineal members. For example, I use aluminum alloys, such as 6061 or 6063 alloys, for making both the extruded lineal members and extruded universal joining members. This allows for ease in recycling and simplifies the overall manufacturing process if I limit the entire process to a single aluminum alloy. In certain applications, however, I may use a 7xxx series alloy instead of a 6xxx series alloy to obtain additional strength coupled with a somewhat thinner extrusion. In addition, I prefer that the spans 52 and 54 and members 56 and 58 are made as one piece using the extrusion process. This improves manufacturing efficiency and simplifies the overall process.

Joining members 50a and 50b are attached to lineal members 12 and 32 by any suitable means such as welding. Preferably, I apply a uniform layer of an adhesive 65 to the surfaces 22a and 22b prior to joining. This allows the quality inspection of adhesive on the metal surface prior to the pieces being joined. In cases where access is limited, adhesive can be applied through adhesive injection holes 64a and 64b to attach the joining members to the lineal members. Suitable adhesives include modified epoxy or acrylic, most preferably I use a modified epoxy adhesive such as 3M® DP420 or DP460, Magnoliea 6250 Or 6384, and Hysol 9430 or an acrylic such as Lord 250, 256, f320 or V406.

Preferably, the gap between the mating surfaces of interlocking grooves 60 and 62 with lineal member grooves 14a and 14b ranges between 0.2 to 0.6 mm with 0.4 mm being the optimum. Larger tolerances can, however, be accepted. In these cases it is necessary to use a larger gap filling adhesive such as the acrylics mentioned above. Moreover, it may be necessary to increase the size of the joining members to increase the surface area for bonding. In this embodiment, the lower strength adhesive will produce an acceptable bond.

Preferably, before I apply the adhesive, I prepare the outside surfaces of the lineal members and joining members to increase the activation energy of these surfaces and thereby improving the bond between the bond and the metal. I can accomplish this in two ways. I can either chemically etch these surfaces or I can grit blast them. Although chemical etching is generally more effective, I prefer to grit blast because it is usually more economical.

The primary function of the grooves is to improve the strength of the joint. Without the grooves, adhesives can be susceptible to catastrophic failure along shear paths, once a failure is initiated. The initiation is often induced by peel forces at the end of the bond line. The introduction of grooves staggers the bond line, making it less vulnerable to catastrophic failure. The interlocking of the lineal members and the joining members also improves the peel force resistance of the particular joint. While in service, the joints are flexed in various directions. Adhesives are most efficient when they are stressed in shear. The inclusion of the grooves increases the peel force resistance to resultant stresses out of the shear plane.

Beneficially, the interlocking grooves provide the additional advantage of self-alignment. That is, the interlocking grooves hold the joint in place while the adhesive dries and bonds the members together. In contrast, parts to be welded must somehow be held precisely in place by fixtures or other extraneous means. This, of course, further complicates the manufacturing process and can potentially produce additional errors in tolerance. The interlocking grooves of the present invention eliminates this concern.

Using adhesives with the present invention allows maximum design flexibility. In contrast, when heat treatable alloys are welded together, the welds create heat affected zones in the members where the alloy's properties have been altered. During the design phase, to compensate for these soft spots in the alloy, designers must introduce a safety factor or an increased thickness of alloy to guarantee that the space frame will perform as desired. In contrast, the use of adhesives does not create the inconsistencies that welds do and a the space frame can be designed to take advantage of the full T6 or maximum mechanical strengths properties for heat treatable alloys. In general, the adhesive bond is stronger than either the lineal member or universal joining member. This combination of adhesive and heat treatable alloys allows the thinnest wall potential to be utilized and therefore provides the maximum in lightweighting possibilities. The grooves significantly increase the surface area of the adhesive and therefore reduces the surface area needed to exceed the extrusion material strength thereby increasing the strength of the joint.

Depending upon the particular application, there are several techniques that I can apply my invention to increase the strength of a particular joint. First, I can increase the surface area of the joining members that contact the lineal members. For example, I can increase the length of the spans so that they have more common area with the sides of the lineal members. In addition, I can increase the length and width of the interlocking member to increase the overlap between the interlocking members and the widths of the lineal members. Second, I can increase the thickness of the cross section of the universal joining member to increase its strength. And third, I can increase strength by selecting a different alloy. For example, for the lineal member I may upgrade from a 6063 to a 6061 to improve strength or for the joining members, I may switch from a 6xxx series alloy to a 7xxx series alloy for greater strength, depending upon the application. One skilled in the art will appreciate that these variables can be optimized to produce the most desirable design.

For larger extrusions, it is sometimes difficult to maintain close tolerance control. In general, the longer the length of extruded member, the more chance for variance. Thus, I sometimes prefer to use two pair of universal joining members so that I have greater control of tolerance on each member.

Referring now to FIGS. 4 and 5, I describe a preferred embodiment of the present invention which is particularly suited for larger extension profiles by providing for better control of tolerance. System 110 comprises a pair of lineal members 112 and 132 which are held together by two pair of universal joining members 150a and 150b. The first lineal member 112 has two interlocking sides where each side has a plurality of substantially similar longitudinal parallel grooves 114a and 114b, running the length of first lineal member 112. The second lineal member has a top surface 138 and a bottom surface 140. The first lineal member 112 is positioned substantially perpendicular to top surface 138 of the second lineal member 132 so that bottom end 120 sits flush against top surface 138. To standardize manufacture, I prefer to use second lineal members which are identical in shape and size to the first lineal members described above. Specifically, I prefer that the second lineal member 132 includes a plurality of substantially similar longitudinal parallel grooves 134a running the length of the top surface 138 and similar longitudinal grooves 134b running the length of bottom surface 140.

In general, the pair of lineal members 112 and 132 are joined together by way of two pair of universal joining members 150a and 150b. Each of the four joining members 150a, b, c, and d comprise spans 152a, 152b, 154a and 154b and interlocking members 156a, 156b, 158a, and 158b. Specifically, interlocking member 156a is mounted perpendicularly to span 150b; interlocking member 156b mounted perpendicularly to span 152a; interlocking member 158a positioned perpendicularly to span 154b; interlocking member 158b mounted perpendicularly to span 154a. Preferably, each of the four joining members are extruded as a single shape. Each interlocking member comprises a plurality of substantially similar grooves 160, 161, 162 and 163 which extend generally across the width of each corresponding interlocking member 156b, 156a, 158a, and 158b. Joining members 150a and 150b are mounted to lineal member 132 such that spans 152a and 152b are flush against side 142a and grooves 160 interlock with grooves 114b of lineal member 112 and grooves 161 interlock with grooves 114a of lineal member 112. Similarly, joining members 150c and 150d are mounted to lineal member 132 such that spans 154a and 154b are flush against side 142b and grooves 162 interlock with grooves 114b and grooves 163 interlock with grooves 114a.

Alternatively, joining members 150a and 150b can be a single extruded member and likewise, joining members 150c and 150d can be a single extruded member. This simplifies the manufacturing process by reducing the number of parts and corresponding inventory. In general, however, adhesive should be applied through injection holes 164 after the lineal members and joining members have been interlocked.

For the reasons stated above, the lineal members and joining members can be any aluminum alloy or other light metal but I prefer that all members be constructed out of an extruded aluminum alloy such as 6061, 6063 or variations thereof. In general, as with other embodiments, I prefer to use hollow lineal members having 2 to 9 substantially parallel grooves where each groove has a width ranging from about 3 to 20 mm and a depth ranging from about 1.5 to 3.0 mm.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. An automotive space frame joining structure, comprising:
    an extruded lineal member having a longitudinal axis and a series of grooves that define alternating areas of increased thickness along the length of the lineal member, the grooves are substantially parallel to the axis and to each other in an area to be joined to a joining member;
    an extruded joining member having a series of grooves that define alternating areas of increased thickness along the length of the joining member, the grooves are substantially parallel to the axis and to each other in the area to be joined;
    the grooves of lineal member are placed in an interlocking relationship with the areas of increased thickness of the joining member, and
    the areas of increased thickness of the lineal member are placed in an interlocking relationship with the grooves of the joining member.

2. The system of claim 1 wherein the extruded lineal members are constructed of a light metal.

3. The system of claim 1 wherein the lineal member is substantially hollow having a wall thickness ranging from about 2.0 to 8.0 mm.

4. The system of claim wherein the joining member is attached to the lineal member by an adhesive selected from the group consisting of modified epoxy adhesives and modified acrylic adhesive and the lineal member comprises groove that are at a substantially 90° angle relative to the axis of the lineal member.

5. The system of claim 4 wherein the joining member further comprises a plurality of adhesive injection holes.

6. The system of claim 1 further comprising a second lineal member, wherein the first lineal member is positioned substantially perpendicular relative to the second lineal member.

7. The system of claim 1 further comprising a second lineal member, wherein the first lineal member is positioned at a 45° angle relative to the second lineal member.

8. The system of claim 1 wherein the grooves of the lineal member have width ranging from about 3.0 to 20 mm and a depth ranging from about 1.5 to 3.0 mm.

9. An automotive space frame joining structure, comprising:
    a plurality of extruded lineal members, each lineal member having a longitudinal axis and a series of grooves that define alternating areas of increased thickness along the length of the lineal member, the grooves are substantially parallel to the axis and to each other in an area to be joined to a joining member;
    a plurality of extruded joining members, each joining member having a series of grooves that define alternating areas of increased thickness along the length of the joining member, the grooves are substantially parallel to the axis and to each other in the area to be joined;
    the grooves of lineal member are placed in an interlocking relationship with the areas of increased thickness of the joining member, and
    the areas of increased thickness of the lineal member are placed in an interlocking relationship with the grooves of the joining member
    the lineal members and the joining members form an automotive space frame.

10. The system of claim 1 wherein the extruded lineal member are constructed of a light metal.

11. The system of claim 9 wherein the lineal member is substantially hollow having a wall thickness ranging from about 2.0 to 8.0 mm.

12. The system of claim 9 wherein the joining members are attached to the lineal members by an adhesive selected from the group consisting of modified epoxy adhesive and modified acrylic adhesive and the grooves of the lineal members are at a substantially 90° angle relative to the surface of the lineal members.

13. The system of claim 9 wherein the joining members further comprise a plurality of adhesive injection holes.

14. The system of claim 9 further comprising a second lineal member, wherein the first lineal member is positioned substantially perpendicular relative to the second lineal member.

15. The system of claim 9 wherein the grooves of the lineal member have width ranging from about 3.0 to 20 mm and a depth ranging from about 1.5 to 3.0 mm.

16. An automotive space frame joining structure whose members are constructed of extruded aluminum alloy, comprising:
    a plurality of aluminum, extruded lineal members, each lineal member having a longitudinal axis and a series of equally spaced grooves that define alternating areas of increased thickness along the length of the lineal member, the grooves are substantially parallel to the axis and to each other in an area to be joined to a joining member;

a plurality of aluminum, extruded joining members, each joining member having a series of equally spaced grooves that define alternating areas of increased thickness along the length of the lineal member, the grooves are substantially parallel to the axis and to each other in the area to be joined;

the grooves of lineal member are placed in an interlocking relationship with the areas of increased thickness of the joining member, and the areas of increased thickness of the lineal member are placed in an interlocking relationship with the grooves of the joining member the lineal members and the joining members form an automotive space frame.

17. The system of claim 16 further comprising a second lineal member, wherein the first lineal member is positioned at a 45° angle relative to the second lineal member.

18. The system of claim 16 wherein the lineal members are substantially hollow having a wall thickness ranging from about 2.0 to 8.0 mm.

19. The system of claim 16 wherein the joining members are attached to the lineal members by an adhesive selected from the group consisting of modified epoxy adhesives and modified acrylic adhesives and the lineal members comprise grooves that are at a substantially 90° angle relative to the surfaces of the lineal members.

20. The system of claim 16 wherein the joining mean further comprises a plurality of adhesive injection holes.

21. The system of claim 16 further comprised a second lineal member, wherein the first lineal member is positioned substantially perpendicular relative to the second lineal member.

22. The system of claim 16 further comprising a second lineal member, wherein the first lineal member is positioned at a 45° angle relative to the second lineal member.

23. The system of claim 16 wherein the longitudinal grooves of the first lineal member have width ranging from about 3.0 to 20 mm and a depth ranging from about 1.5 to 3.0 mm.

* * * * *